US006626040B1

(12) United States Patent
Pereira et al.

(10) Patent No.: US 6,626,040 B1
(45) Date of Patent: Sep. 30, 2003

(54) HIGH-G HARDENED SENSORS

(75) Inventors: Carlos M. Pereira, Tannersville, PA (US); Jahangir S. Rastegar, Stony Brook, NY (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/175,529

(22) Filed: Jun. 19, 2002

(51) Int. Cl.[7] ............................................. G01P 15/00
(52) U.S. Cl. ..................................... 73/514.38
(58) Field of Search ...................... 73/514.36, 514.38, 73/652

Primary Examiner—Richard A. Moller
(74) Attorney, Agent, or Firm—Michael Sachs; John Moran

(57) ABSTRACT

A sensor including: a base; at least one component which moves relative to the base; and a locking device for locking the at least one component in a predetermined stationary position in response to an external stimulus. Where the sensor is an accelerometer, the external stimulus is preferably an acceleration of the sensor in which case the locking device locks the at least one component during periods in which the acceleration exceeds a predetermined value. The predetermined stationary position can be a null position taken by the at least one component corresponding to an acceleration that is substantially zero or an active position taken by the at least one component when acceleration equals a predicted acceleration other than zero. Further, the locking device can lock the at least one component actively or passively.

20 Claims, 5 Drawing Sheets

HIGH-G HARDENED SENSORS

U.S. GOVERNMENT INTEREST

The inventions described herein may be manufactured, used and licensed by or for the U.S. Government for U.S. Government purposes.

BACKGROUND OF THE INVENTION

1. Field of the Invention

The present invention relates generally to sensors, and more particularly, to high-g hardened accelerometer sensors.

2. Prior Art

The state of art in shock resistant accelerometer design is to reduce the size of the moving proof mass, thereby reducing the related forces, moments, and torques that are generated in the presence of high acceleration levels, i.e., when the accelerometer experiences shock or impact loading, thereby making it possible to provide stops in the path of the moving component(s) of the accelerometer to limit its maximum deflection. The introduction of MEMS technology in recent years has made it possible to reduce the size of the proof mass significantly, independent of the accelerometer type and its mechanism of operation. All existing accelerometer designs, however, suffer from the following operational and/or performance deficiencies.

There is a significant amount of settling time required for the accelerometer to settle within an acceptable level following shock loading. Many types of sensors, particularly accelerometers, rely upon the deflection of one or more structural elements of the sensor, which due to the high-g loading and the inevitable mass (inertia) of the structural element, a deflection results. In a high-g state, the deflection results in a vibration of the structural element. The time until the vibration ceases or reduces to an acceptable value is referred to as a settling time. The settling time is particularly important for accelerometers that are used as IMUs on guns or similarly fired projectiles and that are intended to be used for navigation and/or guidance and/or control.

For accelerometers that are designed without proof mass limit stops, accelerometer designs that allow high low-g sensitivity while can tolerate high-g shock loads without permanent damage or change in their characteristics, are yet to be conceived. Due to the nature of all proof mass based accelerometers, high sensitivity to low acceleration levels make them highly susceptible to shock loading damage since they rely on relatively large deformations to be induced in the accelerometer mechanism due to small input accelerations.

Therefore, there is a need in the art for sensors, in particularly accelerometers, which are sensitive enough to provide accurate sensing of a desired parameter, such as acceleration, yet rugged enough to withstand shock loading due to an external stimulus such as a high acceleration. Furthermore, there is a need in the art for sensors, in particularly accelerometers, in which the settling time of a deflected member is minimized.

SUMMARY OF THE INVENTION

Therefore it is an object of the present invention to provide such a sensor that overcomes the aforementioned problems of the prior art.

Accordingly, a sensor is provided. The sensor comprises: a base; at least one component which moves relative to the base; and locking means for locking the at least one component in a predetermined stationary position in response to an external stimulus. Preferably, the sensor is an accelerometer in which case the external stimulus is preferably an acceleration of the sensor and the locking means locks the at least one component during periods in which the acceleration exceeds a predetermined value.

In a first variation of the sensor, the predetermined stationary position comprises a null position taken by the at least one component corresponding to an acceleration that is substantially zero. In an alternative variation of the sensor, the predetermined stationary position comprises an active position taken by the at least one component when acceleration equals a predicted acceleration other than zero.

In a first variation of the locking means of the sensor, the locking means preferably comprises an active means for locking the at least one component in the predetermined stationary position in response to the external stimulus. In which case, the locking means preferably comprises: at least one movable member movably disposed on the base and configured to engage at least a portion of the at least one component; means for generating a lock signal in response to the external stimulus and an unlock signal in response to the absence of the external stimulus; and an actuator for moving the at least one movable member into engagement with the at least one component to lock the at least one component in response to the lock signal and to unlock the at least one component in response to the unlock signal.

In a second variation of the locking means of the sensor, the locking means comprises a passive means for locking the at least one component in the predetermined stationary position in response to the external stimulus. In which case, the locking means comprises: a first locking mass movably disposed about the base in a first direction; and a second locking mass movably disposed about the base in a second direction opposite the first direction; wherein the first and second locking masses move to sandwich the at least one component therebetween in response to the external stimulus. In the second variation, the locking means further preferably comprises a locking stop positioned between the first and second locking masses and corresponding to the predetermined stationary position, wherein the locking stop and the at least one component are sandwiched between the first and second locking masses in response to the external stimulus.

Also provided is a method for protecting a sensor from an external stimulus. The method comprises: providing a sensor having a base and at least one component which moves relative to the base; and locking the at least one component in a predetermined stationary position in response to the external stimulus.

Where the external stimulus is an acceleration of the sensor, in a first variation the locking comprises locking the at least one component in a null position taken by the at least one component corresponding to an acceleration that is substantially zero.

Where the external stimulus is an acceleration of the sensor; in a second variation the locking comprises locking the at least one component in an active position taken by the at least one component when acceleration equals a predicted acceleration other than zero.

Where the external stimulus is an acceleration of the sensor, the locking preferably comprises locking the at least one component during periods in which the acceleration exceeds a predetermined value.

In a first variation of the locking, the locking comprises actively locking the at least one component in the predetermined stationary position in response to the external stimulus. In which case, the locking comprises: providing at least one movable member movably disposed on the base and configured to engage at least a portion of the at least one component; generating a lock signal in response to the external stimulus and an unlock signal in response to the absence of the external stimulus; and moving the at least one movable member into engagement with the at least one component to lock the at least one component in response to the lock signal and to unlock the at least one component in response to the unlock signal.

In a second variation of the locking, the locking comprises passively locking the at least one component in the predetermined stationary position in response to the external stimulus. In which case, the locking comprises: providing a first locking mass movably disposed about the base in a first direction and a second locking mass movably disposed about the base in a second direction opposite the first direction; and passively moving the first and second locking masses to sandwich the at least one component therebetween in response to the external stimulus. Preferably, the locking of the second variation further comprises: providing a locking stop positioned between the first and second locking masses and corresponding to the predetermined stationary position; and sandwiching the locking stop and the at least one component between the first and second locking masses in response to the external stimulus.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Figure 1A:
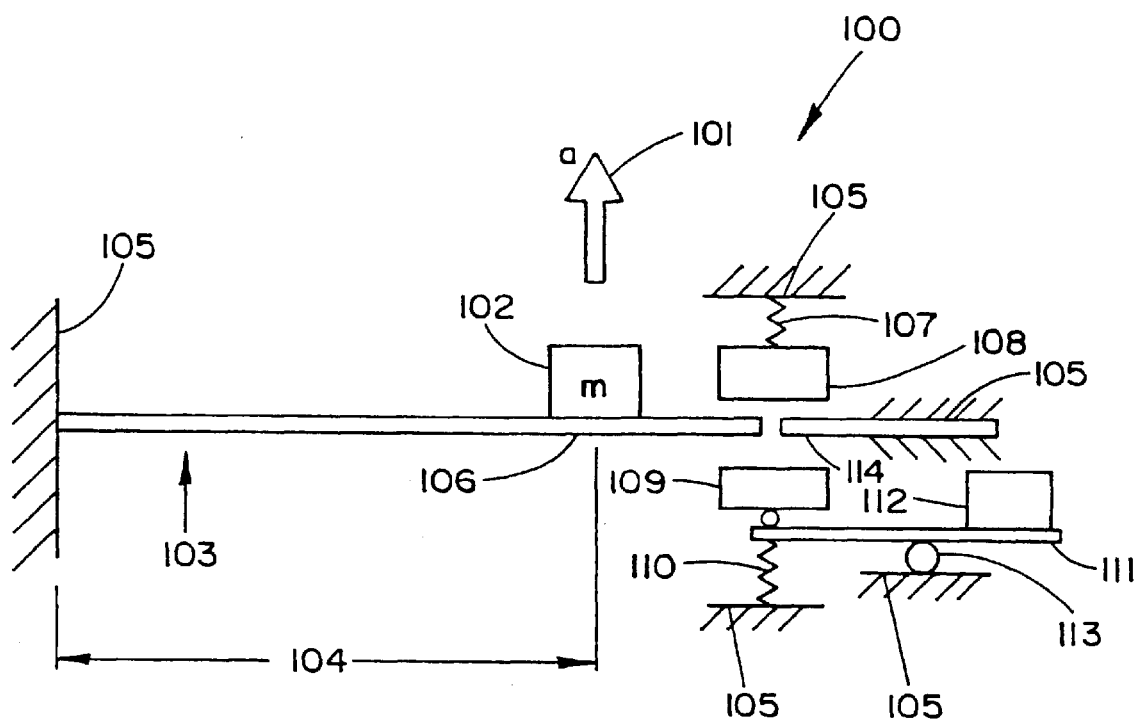
FIG. 1a illustrates a schematic diagram of an accelerometer sensor having a passive means for locking the proof mass in a null position during periods of high acceleration.

Although this invention is applicable to numerous and various types of sensors and external stimulus, it has been found particularly useful in the environment of accelerometers and acceleration, respectively. Therefore, without limiting the applicability of the invention to accelerometers and acceleration, the invention will be described in such environment.

In summary, the sensors of the present invention provide a general method of hardening various sensors with significant structural flexibility (compared to their base structure), particularly for application in devices that are susceptible to residual vibration as the result of shock or similar high acceleration loading. The method by which this is achieved is applicable to all such sensors, but is of particular importance for devices such as sensors and actuators that are desired to be light weight therefore structurally flexible or are required to be light weight or highly deformable (flexible) for their proper operation or to render them highly sensitive to the input to be measured such as for the case of almost all accelerometer based inertia measurement units (IMUs).

In the context of the present inventions, hardening is meant to refer to the following functions: (1) Provision of means to protect the moving parts and various mechanisms of the sensor from physical short term or permanent damage and/or (2) To minimize or effectively eliminate residual vibration of the components of the sensor that would require time to settle before the device could begin or resume its normal operation. The residual vibration is generally due to the elastic deformation of one or more movable components of the sensor and result in a certain amount of potential energy to be stored in these components during shock loading and would cause residual vibration until it is absorbed (damped) by passive or active means.

The disclosed embodiments for MEMS accelerometers (IMUs) are general in design and are applicable to all basic elastic deformation based accelerometer designs, e.g., all those based on torsional deformation, bending deformation, axial deformation and their various combinations.

The basic operation of the various embodiments of the sensors of the present invention is based on locking one or more moving components of the sensor to a relatively rigid base structure of the accelerometer during the period(s) in which the accelerometer experiences shock loading. In an accelerometer, this moving component is referred to as a proof mass (and/or other moving components of the accelerometer to which the proof mass is rigidly attached). The locking or braking action of the moving component and the mechanism of its operation may be described to be basically: (1) Active, i.e., require externally powered actuation for its operation; (2) Passive, i.e., require no external power and its operation is automatically triggered when the acceleration levels reach certain preset levels; or (3) a combination of the aforementioned active and passive designs.

In addition, the locking mechanism may have the means to lock the proof mass or the aforementioned moving component(s) to which it is rigidly attached, at a predetermined position corresponding to an acceleration offset, usually at a level close to the level at which the acceleration measurements have to be resumed following unlocking of the proof mass or the aforementioned moving component(s). The offset may be programmable into the sensor, in which case external power would generally be required to activate some actuation means to affect and/or vary the offset level. The offset may also be actively set or built into the sensor, in which case external power is not required to put it into effects In the following description, the aforementioned methods of hardening the sensors and the various embodiments of their application are described in terms of accelerometers (IMUs) in general, and those designed to be produced using MEMS (microelectromechanical devices) technology in particular. However, it can be appreciated by those of ordinary skill in the art that the disclosed methods are readily applicable to all devices such as various sensors and actuators with moving parts, particularly those constructed with flexible elements for their proper operation or for reasons such as to reduce weight (mass or inertia). The sensors and methods of the present invention are at least partly used to provide the means to lock or brake the primary moving components of various sensors that are subject to shock loading to protect them from damage during shock loading and where appropriate, to minimize residual vibration and settling time.

Figure 1B:
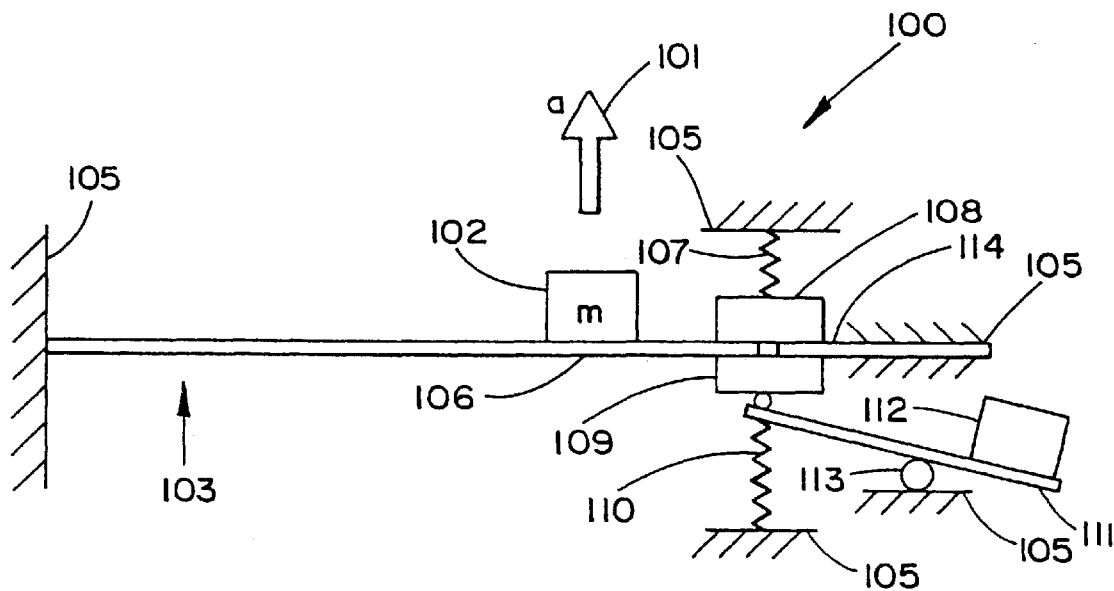
FIG. 1b illustrates the schematic of FIG. 1a in which the proof mass is locked in the null position.

Referring now to FIGS 1a and 1b, there is an accelerometer 100 shown schematically therein, which is intended to measure acceleration in the direction 101. The accelerometer consists of a proof mass 102 which is rigidly attached to a relatively rigid base 106 (plate), a cantilever (bending) type of elastic element 103 with an equivalent spring rate k at the location of the proof mass 102 and in the direction of the acceleration 101. The proof mass 102 (with mass m) is located a distance 104 (with length l) from the base 105 to which the elastic beam element 103 is rigidly attached. In most MEMS types of accelerometers, the displacing plate 106 forms one side of a capacitor while the other capacitor plate (not shown) is rigidly attached to the base 105. This capacitor will then form the sensor that measures the elastic displacement of the proof mass due to the acceleration in the direction 101.

The basic mechanism of the aforementioned locking of the proof mass consists of locking a first locking mass 108 which is attached to the base 105 by spring 107 on one side and locking a second locking mass 109 and spring 110 on the opposite side of the proof mass base plate 106. The second locking mass 109 is attached to a lever arm 111, which is hinged to the base 105 by the rotational joint 113. The spring 110 is attached to the base 105 on one end and to the lever arm 111 on the other. Opposite to the second locking mass 109 is positioned a moment mass 112 which provides a moment about the hinge joint 113. The moment mass 112 has a greater mass than that provided by the first locking mass 109, thereby it tends to move the first locking mass 109 upwards due to the acceleration in the direction 101.

The spring rates of the springs 107 and 110 are selected such that at the desired acceleration levels the gap between the first and second locking masses 109, 108 and the plate 106 begins to close. A spaced locking stop 114 is located along the plate 106 to limit the motion of the first and second locking masses 109, 108. As a result, when the acceleration in the direction 101 reaches the level, the first and second locking masses 109, 108 close the aforementioned gap, and thereby hold the base 106 and the proof mass 102 stationary at its null point, as shown in FIG. 1b.

In general, the springs 107 and 110 are preferably preloaded, i.e., provide a preset force in the direction of providing the required gap between themselves and the base 106, and as the acceleration level reaches the desired maximum level, they will begin to close the gap.

Those skilled in the art will appreciate that a number of variations of the design illustrated in FIG. 1a may also be utilized. For example, the first and second locking masses 109, 108 may be actively operated by a toggle type of mechanism that "switches" the first and second locking masses 109, 108 to their locking position as the desired acceleration level is reached. The elastic lever arm 106 may also be similarly locked in its null position if desired to further reduce residual vibration.

A basic mechanism to lock the proof mass 102 and/or other moving components of an accelerometer is described above using an elastic beam type of accelerometer. The design, however, can be seen to be applicable to almost all accelerometer designs, particularly those constructed using MEMS technology, such as those employing a linear displacement, a ring type, and a torsional type of accelerometer. The disclosed devices are based on utilizing locking masses that are operated by preloaded springs and lever type or other similarly operated mechanisms, however, it will be appreciated by those skilled in the art that other mechanisms are possible for locking the moving components of accelerometers and other sensors.

Furthermore, the springs utilized in the disclosed devices are preferably preloaded to the desired level such that as a certain acceleration level is reached, they begin to limit the motion of the proof mass and bring it to its null position (or toggle switch like mechanisms are activated to force the locking masses to bring the proof mass to its null position). In the above description, the operation of the first and second locking masses 109, 108 is passive, i.e., does not require external power. Similar operation may obviously be performed using external power to actively actuate the first and second locking masses 109, 108 into their locking position.

Figure 2A:
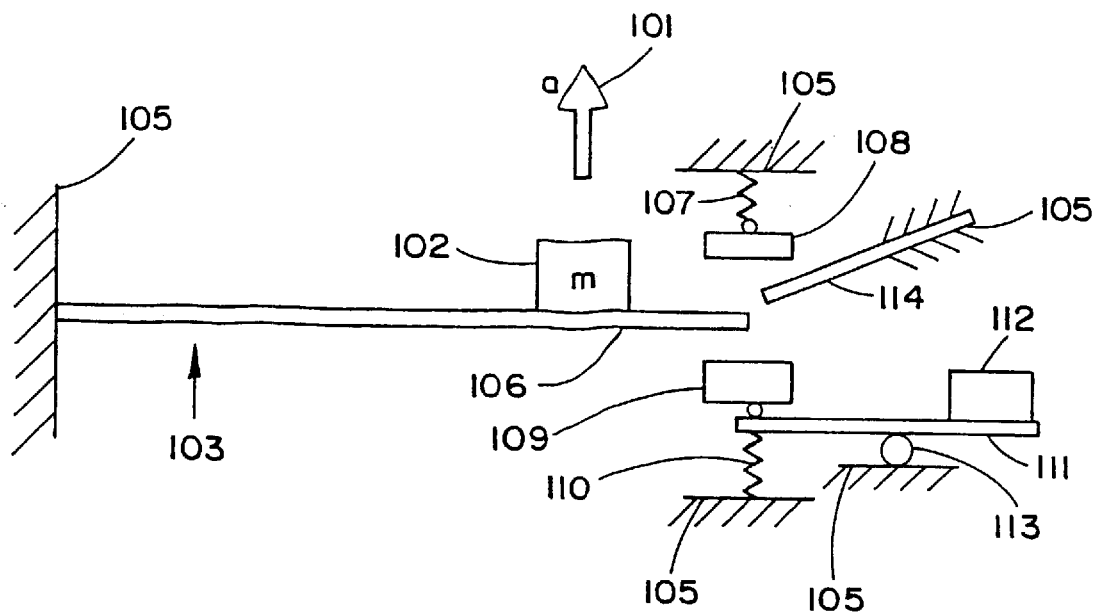
FIG. 2a illustrates a schematic diagram of an accelerometer sensor having a passive means for locking the proof mass in an active position during periods of high acceleration.

Referring now to FIG. 2a, there is shown a variation of the device of FIG. 1a in which similar reference numerals denote similar features. The device of FIG. 2a differs from that of FIG. 1a in that the locking stop 114 can be fixed in a predetermined position other than the null position. For instance, the locking stop 114 can be fixed in a position corresponding to an acceleration, which is expected after the initial shock loading (i.e., after the initial high acceleration). The stop plate 114 can be fixed in such a position, actively placed in such a position, or actuated into such position by an actuation means (not shown). Furthermore, such position can be varied depending on the situation at hand.

Figure 2B:
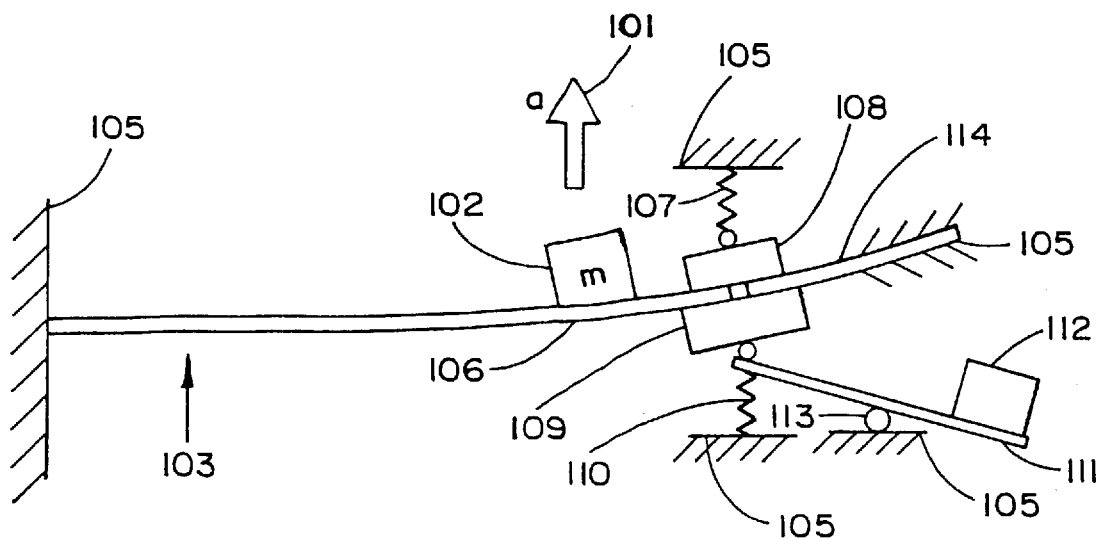
FIG. 2b illustrates the schematic of FIG. 2a in which the proof mass is locked in the active position.

FIG. 2b illustrates the device of FIG. 2a in which the device experiences a high acceleration and the first and second locking masses 109, 108 sandwich the plate 106 (and the proof mass 102 therewith) and the locking plate 114 therebetween to lock the proof mass 102 in the predetermined position. To facilitate the second locking mass's 108 contact with the plate 106 and locking plate 114, it is preferred that a pivoting joint be provided between the second locking mass 108 and the spring 107.

Figure 3A:
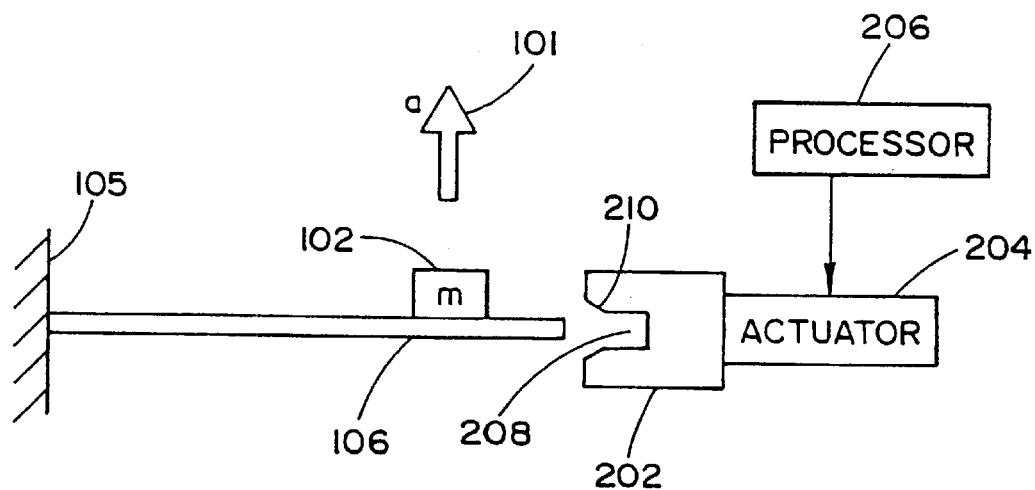
FIG. 3a illustrates a schematic diagram of an accelerometer sensor having an active means for locking the proof mass in a null position.
Figure 3B:
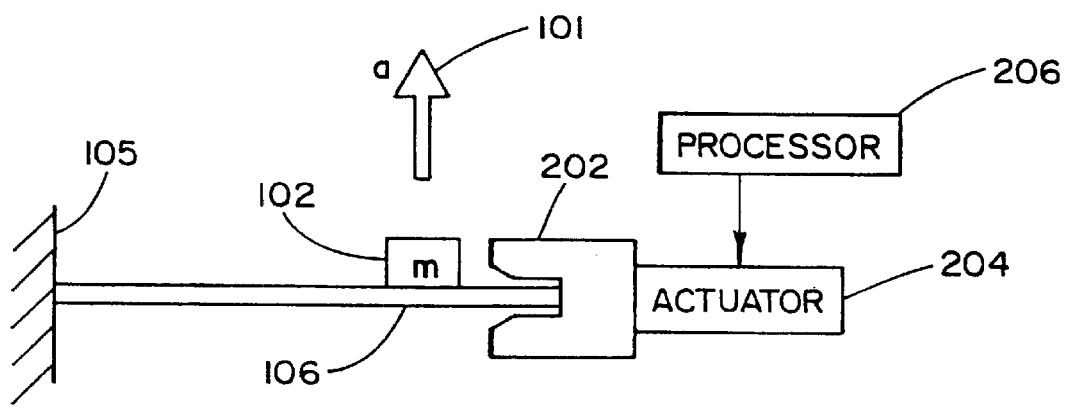
FIG. 3b illustrates the schematic of FIG. 3a in which the proof mass is locked in the null position by the active locking means.

Referring now to FIGS. 3a and 3b, an accelerometer is illustrated having a cantilevered proof mass 102 on a plate 106. The means for locking the proof mass 102 during periods of high acceleration comprises a movable member 202 which is actively actuated into the locking position as-shown in FIG. 3b by an actuator 204 in response to a locking signal from a processor 206. Similarly, the movable member 202 is retracted from the locked position as shown in FIG. 3a by the actuator in response to an unlocking signal from the processor 206. Preferably, the processor bases its locking and unlocking signals on time from a particular event, such as the firing of a projectile.

Alternatively, the movable member can be biased into one of the locked or unlocked positions and be actuated into the other by the actuator 204. The movable member preferably has a u-shaped mouth 208 with a tapered leading edge 210 to capture the plate 106 when it is to be locked. Similar to the devices described with regard to FIGS. 1a and 2a, the device of FIG. 3a can lock the plate 106 and proof mass 102 in either a null position or any other predetermined position.

Figure 3C:
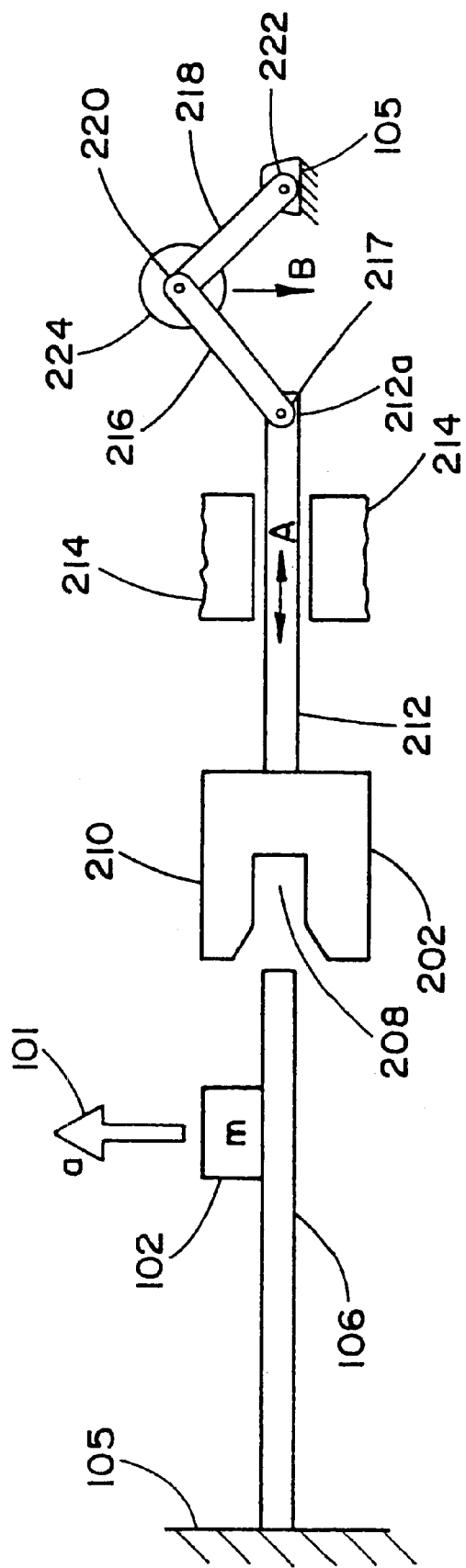
FIG. 3c illustrates the accelerometer sensor of FIGS. 3a and 3b having a passive means for locking the proof mass in a null position during periods of high acceleration.

Referring now to FIG. 3c, there is shown a version of the accelerometer of FIGS. 3a and 3b in which a passive means for locking the proof mass in a null position during periods of high acceleration is employed. The accelerometer of FIG. 3c employs the same reference numerals for similar elements illustrated and described with regard to FIGS. 3a and 3b. In the accelerometer of FIG. 3c, the movable member 202 is connected to a movable shaft 212 which is retained to move in direction A, preferably, by bearings 214. At an end 212a of the movable shaft 212 is pinned a first link 216 at pivot point 217. A second link 218 is connected to the first link at pivot point 220. The second link 218 is further pinned to ground 105 at pivot point 222.

A locking mass 224 is connected at pivot point 220 at the intersection of the first and second links 216, 218. Upon a high acceleration (a) in the direction of arrow 101, the locking mass 224 travels in the direction of arrow B, which in turn results in the movable shaft 212 and movable member 202 connected thereto to move to the left into a locked position similar to that shown in FIG. 3b. A biasing means, such as a torsional spring (not shown) disposed at the intersection of the first and second links 216, 218, aids the movable member 202 in returning to the unlocked position when the acceleration returns to normal levels.

Figure 4:
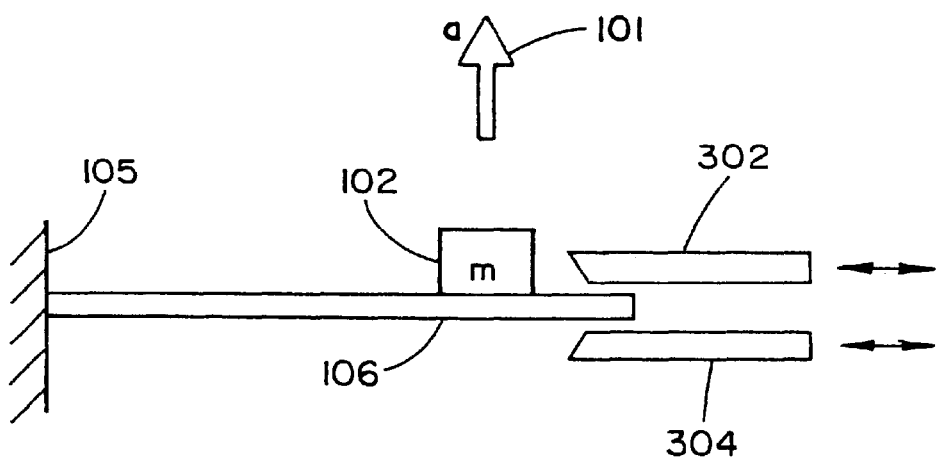
FIG. 4 illustrates a schematic diagram of an accelerometer sensor in which the active locking means which can also act as a stop.

Referring now to FIG. 4, there is illustrated a variation of the device of FIG. 3a in which like reference numerals denote like features. In the device of FIG. 4, the movable member comprises first and second stops 302, 304 which when moved together provide the same functionality as the movable member 202 of FIG. 3a. Although not illustrated, the first and second stops 302, 304 are actuated by an actuator in response to a locking and unlocking signal similar to that described above with regard to the device of FIG. 3a. However, the first and second stops 302, 304 can also move independently to provide either a lower or upper stop for limiting the motion of the proof mass 102 in the lower or upper direction, respectively. Similar to the devices described with regard to FIGS. 1a, 2a, and 3a, the device of FIG. 4a can lock the plate 106 and proof mass 102 in either a null position or any other predetermined-position. Furthermore, the first and second stops 302, 304 can be positioned in any position along the length of travel of the plate 106 and proof mass 102.

Figure 5:
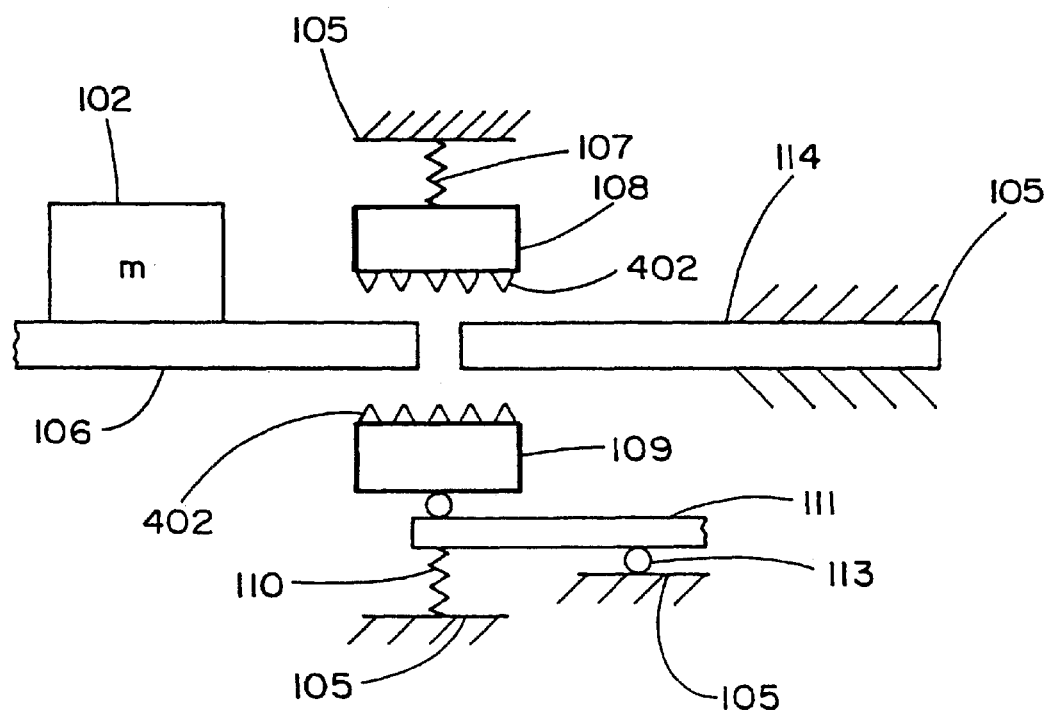
FIG. 5 illustrates a portion of the accelerometer sensor of FIG. 1a in which the locking masses have fingered surfaces to resist sticking with the moving component.

Referring now to FIG. 5, there is illustrated a portion of the accelerometer of FIG. 1a in which the first and second locking masses 109, 108 have fingers 402 projecting from a surface thereof which contact the plate 106. The fingers 402 act to minimize contact areas and to thereby minimize sticking between the first and second locking masses 109, 108 and the corresponding surfaces of the plate 106. Although shown with regard to the accelerometer of FIG. 1a, the devices of FIGS. 2a, 3a, and 4 can also utilize the fingers 402 to prevent sticking. Furthermore, although the surfaces of the first and second locking masses 109, 108 which engage the plate 106 have been shown to be flat, it will be appreciated that they can take any shape, such as convexly curved. Additionally, the surfaces of the first and second locking masses 109, 108 can be rigid, semi-rigid, or flexible such as an elastomer and may even be inflatable wherein the inflation facilitates the locking of the plate 106. The flexibility and/or inflation of the first and second locking masses 109, 108 can also be used to conform to a corresponding surface of the moving component to be locked.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A sensor comprising:
    a base;
    at least one component which moves relative to the base; and
    locking means for locking the at least one component in a predetermined stationary position in response to an external stimulus.

2. The sensor of claim 1, wherein the sensor is an accelerometer.

3. The sensor of claim 2, wherein the external stimulus is an acceleration of the sensor.

4. The sensor of claim 3, wherein the predetermined stationary position comprises a null position taken by the at least one component corresponding to an acceleration that is substantially zero.

5. The sensor of claim 3, wherein the predetermined stationary position comprises an active position taken by the at least one component when acceleration equals a predicted acceleration other than zero.

6. The sensor of claim 3, wherein the locking means locks the at least one component during periods in which the acceleration exceeds a predetermined value.

7. The sensor of claim 1, wherein the locking means comprises an active means for locking the at least one component in the predetermined stationary position in response to the external stimulus.

8. The sensor of claim 7, wherein the locking means comprises:
    at least one movable member movably disposed on the base and configured to engage at least a portion of the at least one component;
    means for generating a lock signal in response to the external stimulus and an unlock signal in response to the absence of the external stimulus; and
    an actuator for moving the at least one movable member into engagement with at least the portion of the at least one component to lock the at least one component in response to the lock signal and to unlock the at least one component in response to the unlock signal.

9. The sensor of claim 1, wherein the locking means comprises a passive means for locking the at least one component in the predetermined stationary position in response to the external stimulus.

10. The sensor of claim 9, wherein the locking means comprises:
    a first locking mass movably disposed about the base in a first direction; and
    a second locking mass movably disposed about the base in a second direction opposite the first direction;
    wherein the first and second locking masses move to sandwich the at least one component therebetween in response to the external stimulus.

11. The sensor of claim 10, wherein the locking means further comprises a locking stop positioned between the first and second locking masses and corresponding to the predetermined stationary position, wherein the locking stop and the at least one component are sandwiched between the first and second locking masses in response to the external stimulus.

12. A method for protecting a sensor from an external stimulus, the method comprising:

providing a sensor having a base and at least one component which moves relative to the base; and locking the at least one component in a predetermined stationary position in response to the external stimulus.

13. The method of claim 12, wherein the external stimulus is an acceleration of the sensor and wherein the locking comprises locking the at least one component in a null position taken by the at least one component corresponding to an acceleration that is substantially zero.

14. The method of claim 12, wherein the external stimulus is an acceleration of the sensor and wherein the locking comprises locking the at least one component in an active position taken by the at least one component when acceleration equals a predicted acceleration other than zero.

15. The method of claim 12, wherein the external stimulus is an acceleration of the sensor and the locking comprises locking the at least one component during periods in which the acceleration exceeds a predetermined value.

16. The method of claim 12, wherein the locking comprises actively locking the at least one component in the predetermined stationary position in response to the external stimulus.

17. The method of claim 16, wherein the locking comprises:

providing at least one movable member movably disposed on the base and configured to engage at least a portion of the at least one component;

generating a lock signal in response to the external stimulus and an unlock signal in response to the absence of the external stimulus; and moving the at least one movable member into engagement with the at least one component to lock the at least one component in response to the lock signal and to unlock the at least one component in response to the unlock signal.

18. The method of claim 12, wherein the locking comprises passively locking the at least one component in the predetermined stationary position in response to the external stimulus.

19. The method of claim 18, wherein the locking comprises:

providing a first locking mass movably disposed about the base in a first direction and a second locking mass movably disposed about the base in a second direction opposite the first direction; and passively moving the first and second locking masses to sandwich the at least one component therebetween in response to the external stimulus.

20. The method of claim 19, wherein the locking further comprises:

providing a locking stop positioned between the first and second locking masses and corresponding to the predetermined stationary position; and sandwiching the locking stop and the at least one component between the first and second locking masses in response to the external stimulus.

* * * * *